(12) United States Patent
Stein et al.

(10) Patent No.: US 7,522,711 B1
(45) Date of Patent: Apr. 21, 2009

(54) DELIVERY OF AUDIO DRIVING DIRECTIONS VIA A TELEPHONE INTERFACE

(75) Inventors: Adam Stein, San Francisco, CA (US);
Justin Denney, San Francisco, CA (US);
Graham Randall, Houston, TX (US);
Chester Day, Cambridge, MA (US);
Keith Coleman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1161 days.

(21) Appl. No.: 10/247,074

(22) Filed: Sep. 18, 2002

Related U.S. Application Data

(60) Provisional application No. 60/345,321, filed on Oct. 19, 2001.

(51) Int. Cl.
*H04M 1/64* (2006.01)

(52) U.S. Cl. .................. 379/88.04; 701/1; 701/200; 701/201; 701/202; 701/207; 701/208; 701/211; 701/212; 701/213

(58) Field of Classification Search ............ 379/88.04; 701/200, 201, 202, 208, 211, 212, 213, 1, 701/207
See application file for complete search history.

(56) References Cited

U.S. PATENT DOCUMENTS

| | | | | |
|---|---|---|---|---|
| 5,802,492 | A * | 9/1998 | DeLorme et al. | 455/456.5 |
| 5,835,881 | A * | 11/1998 | Trovato et al. | 701/211 |
| 6,172,641 | B1 * | 1/2001 | Millington | 342/357.13 |
| 6,539,080 | B1 * | 3/2003 | Bruce et al. | 379/88.17 |
| 7,016,843 | B2 * | 3/2006 | Fitzpatrick et al. | 704/270.1 |
| 2002/0001370 | A1 * | 1/2002 | Walker et al. | 379/88.04 |
| 2002/0138180 | A1 * | 9/2002 | Hessing et al. | 701/1 |
| 2003/0147518 | A1 | 8/2003 | Albal et al. | 379/201.15 |

* cited by examiner

*Primary Examiner*—Quynh H Nguyen
(74) *Attorney, Agent, or Firm*—Perkins Coie LLP

(57) ABSTRACT

Methods for improving the delivery of audio driving directions from a voice portal to a caller via a telephone interface are described. These methods provide accurate and clear audio driving directions in a manner that is easy to use. Moreover, caller-provided inputs are responded to quickly.

9 Claims, 17 Drawing Sheets

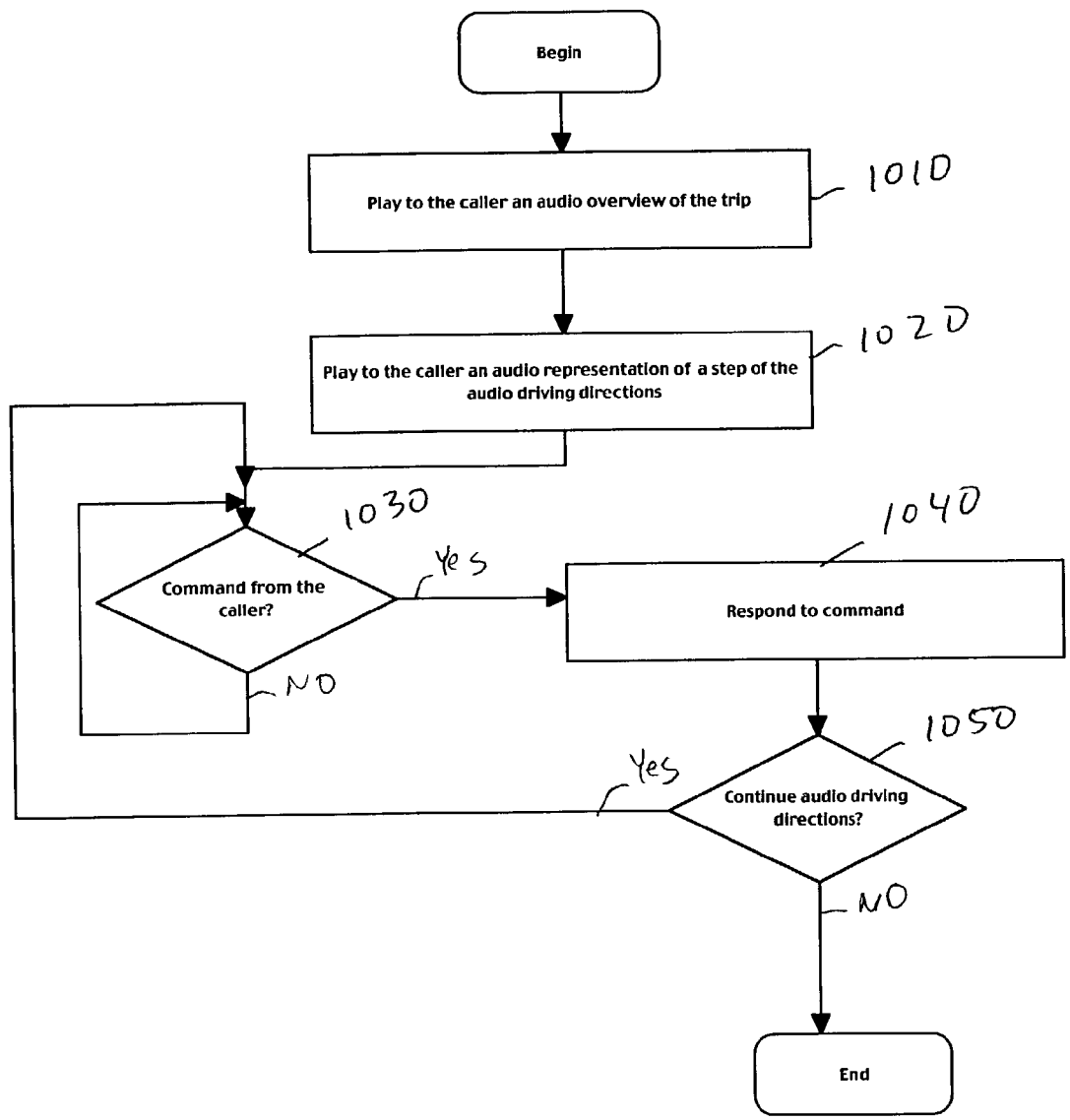

DELIVERY OF AUDIO DRIVING DIRECTIONS VIA A TELEPHONE INTERFACE

RELATED U.S. APPLICATION

This application claims priority to the copending provisional patent application Ser. No. 60/345,321, entitled "Improving Delivery of Audio Driving Directions Via A Telephone Interface," with filing date Oct. 19, 2001.

BACKGROUND OF THE INVENTION

1. Field of the Invention

Embodiments of the present invention generally relate to audio driving directions. More particularly, embodiments of the present invention relate to the field of improving delivery of audio driving directions from a voice portal to a caller via a telephone interface.

2. Related Art

A voice portal provides the caller access to real-time stock quotes, local weather, traffic reports, airline information, audio driving directions, etc. via a telephone interface. The voice portal relies on a mix of speech recognition technology, prerecorded voice responses, and text-to-speech technology to find and dispense caller-requested information without human help. The primary goal of a voice portal is to give phone users access to real-time information and Internet content with minimal hassle.

The delivery of audio driving directions is a popular feature of voice portals. However, the callers that use this feature may become very frustrated, perceiving the audio driving directions feature as lacking a user-friendly design. Usually, each conventional voice portal adapts its audio driving directions feature from a web-based driving directions design. These conventional voice portals fail to take into account that the experience of a caller navigating the audio driving directions feature via a telephone interface is quite different from the experience of a user navigating the driving directions feature via a Web site.

Generally, the caller has priorities and expectations that differ considerably from a Web-site user. In particular, the caller may have a limited amount of time to spend using the audio driving directions feature. Moreover, the caller may expect accuracy, clarity, ease-of-use, and speedy delivery from the audio driving directions feature. This is especially true if the caller is calling from his/her car while driving.

Conventional voice portals neglect to address the priorities, expectations, and concerns of callers. Hence, the callers are generally unsatisfied with their current experience with the audio driving directions feature. This causes the callers to limit their use of the audio driving directions feature, leading to lost revenue and sales opportunities for the conventional voice portals.

SUMMARY OF THE INVENTION

Methods for improving the delivery of audio driving directions from a voice portal to a caller via a telephone interface are described. These methods provide accurate and clear audio driving directions in a manner that is easy to use. Moreover, caller-provided inputs are responded to quickly.

In particular, the voice portal captures the origin and destination addresses from a caller via the telephone interface. Next, raw driving directions are generated based on the origin and the destination addresses. The voice portal generates formatted driving directions based on the raw driving directions. Moreover, the voice portal generates audio driving directions based on the formatted driving directions. Then, the voice portal plays to the caller the audio driving directions in response to commands provided by the caller, whereas the commands enable the caller to navigate through the audio driving directions. The caller inputs a command by providing an utterance corresponding to a particular command or by pressing one or more touch-tone keys corresponding to the particular command.

These and other advantages of the present invention will no doubt become apparent to those of ordinary skill in the art after having read the following detailed description of the embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 10 illustrates a flow chart showing a method of playing to a caller the audio driving directions in accordance with an embodiment of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
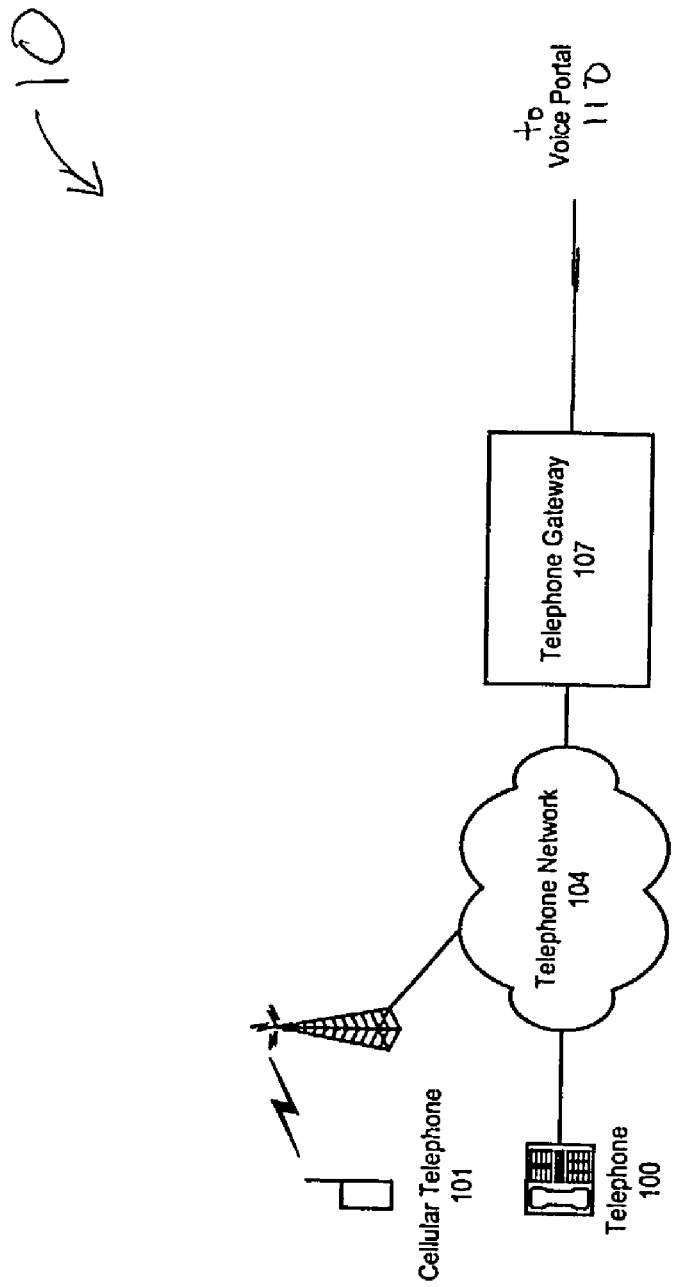
FIG. 1 illustrates a system including embodiments of the invention used to provide the personalization content features, the streaming content features, and informational content features (e.g., audio driving directions) to users of the telephones.

FIG. 1 illustrates a system 10 including embodiments of the invention used to provide the personalization content features, the streaming content features, and informational content features (e.g., audio driving directions) to users of the telephones. The system 10 of FIG. 1 can be used to allow users of standard telephones 100 and cellular telephones 101 to access a voice portal 110 having personalization content features, streaming content features, and informational content features (e.g., audio driving directions) from their telephones.

The following lists the elements of FIG. 1 and describes their interconnections. FIG. 1 includes a telephone 100, a cellular telephone 101, a telephone network 104, a telephone gateway 107, and a voice portal 110. The cellular telephone 101 and the telephone 100 are coupled in communication with the telephone network 104. The telephone network 104 is coupled in communication with the telephone gateway 107. The telephone gateway 107 is coupled in communication with the voice portal 110.

The telephone 100 and the cellular telephone 101 are two different telephone interfaces to the voice portal 110. The telephone 100 and the cellular telephone 101 may be any sort of telephone and/or cellular telephone. For example the telephone 100 or the cellular telephone 101 may be a landline phone, a PBX telephone, a satellite phone, a wireless telephone, and/or any other type of communication device capable of providing voice communication and/or touch-tone signals over the telephone network 104. However, any audio signal-carrying interface could be used.

The telephone network 104 may be the public switched telephone network (PSTN) and/or some other type of telephone network. For example, some embodiments of the invention may allow users with a voice over Internet Protocol (IP) phone to access the voice portal 110. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones 100 and 101. The telephone network 104 generally represents an audio signal-carrying network.

Voice Portal System

Figure 1A:
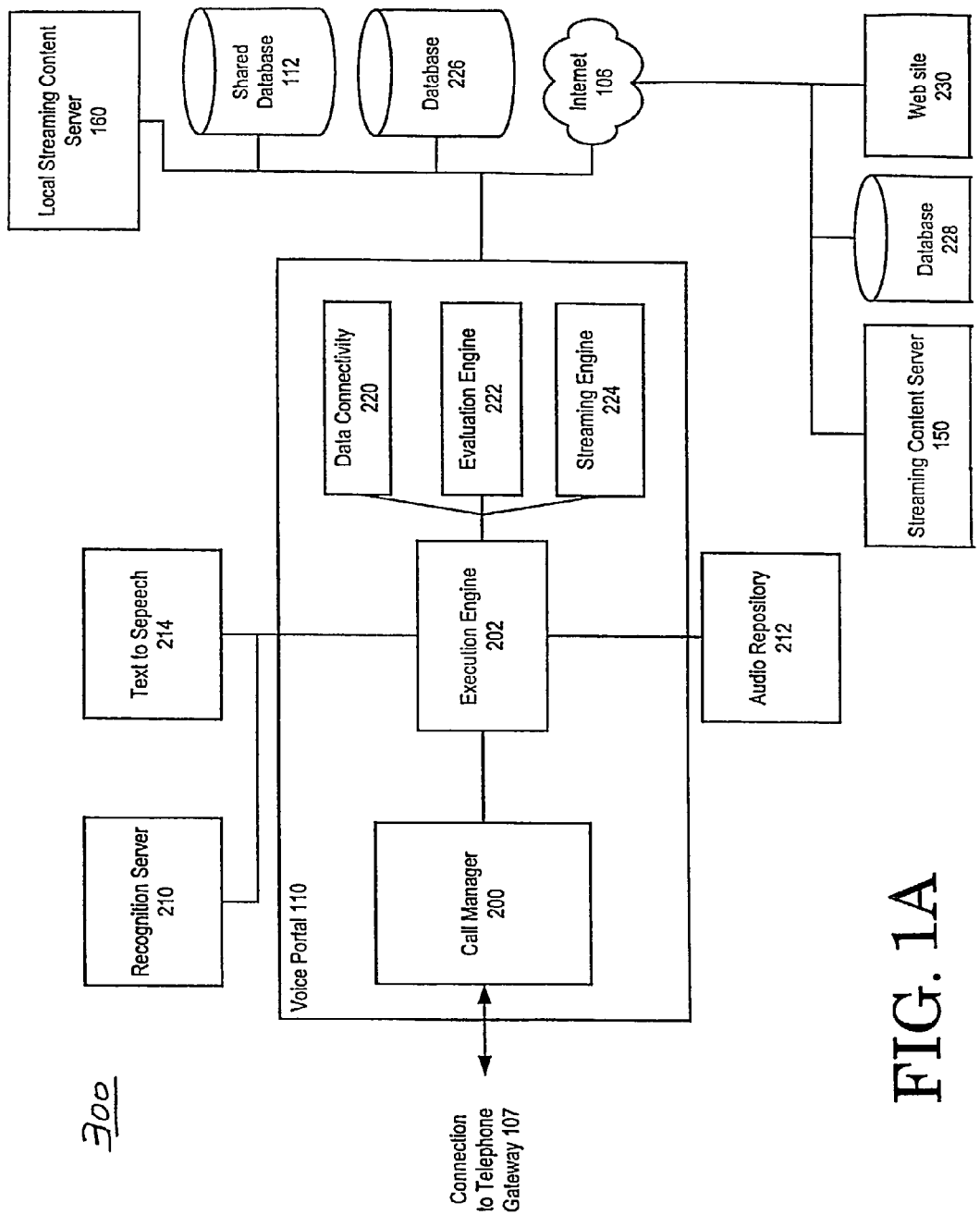
FIG. 1A illustrates the components of a voice portal system supporting personalization content features, streaming content features, and informational content features (e.g., audio driving directions) in accordance with an embodiment of the present invention.

FIG. 1A illustrates the components of a voice portal system 300 supporting personalization content features, streaming content features, and informational content features (e.g., audio driving directions). System 300 can be used to support the embodiments of the present invention described herein. It should be understood that embodiments of the present invention can be practiced in other environments, such as in-car navigation systems and customer service applications.

The following description lists the elements of FIG. 1A and describes their interconnections. The voice portal 110 is coupled in communication with the telephone gateway 107. The voice portal 110 includes a call manager 200, an execution engine 202, a data connectivity engine 220, an evaluation engine 222 and a streaming engine 224. Additionally FIG. 1A includes elements that may be included in the voice portal 110, or which may be separate from, but coupled to, the voice portal 110. Thus, FIG. 1A also includes a recognition server 210, a text to speech serve 214, an audio repository 212, the local streaming content server 160, the shared database 112, a database 226, the Internet 106, a database 228, a streaming content server 150, and a web site 230. The call manager 200 within the voice portal 110 is coupled to the execution engine 202. The execution engine 202 is coupled to the recognition server 210, the text to speech server 214, the audio repository 212, the data connectivity engine 220, the evaluation engine 222, and the streaming engine 224. The voice portal 110 is coupled in communication with the shared database 112, the database 226 and the Internet 106. The Internet 106 is coupled in communication with the streaming content serve 150, the database 228, and the web site 230.

The following describes each of the elements of FIG. 1A in greater detail. The use of each of the elements will be described further in conjunction with description of the personalization content features, the streaming content features, and informational content features (e.g., audio driving directions). Typically, the voice portal 110 is implemented using one or more computers. The computers may be server computers such as UNIX workstation, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, execution engine 202, the data connectivity engine 220, the evaluation engine 222, the streaming engine 224, the audio repository 212, the text to speech 214 server, and/or the recognition server 210.

The call manager 200 is responsible for scheduling call and process flow among the various components of the voice portal 110. The call manager 200 sequences access to the execution engine 202. Similarly, the execution engine 202 handles access to the recognition server 210, the text to speech server 214, the audio repository 212, the data connectivity engine 220, the evaluation engine 222, and the streaming engine 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier™ and/or other voice login and verification products.

The text to speech server 214 supports the conversion of text to synthesized speech for transmission over the telephone gateway 107. For example, the execution engine 202 could request that the phrase, "The temperature in Palo Alto, Calif., is currently 58 degree and rising" be spoken to a caller. That phrase (stored as digitized text) would be translated to speech (digitized audio) by the text to speech server 214 for playback over the telephone network 104 (FIG. 1) on the telephone (e.g. the telephone 100, or the cellular telephone 101). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request play-back of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing. Some embodiments of the invention included telephone systems from Dialogic, an Intel Corporation.

The execution engine 202 supports the execution of multiple threads, with each thread operating one or more applications for a particular call to the voice portal 110. Thus, for example, if the user has called in to the voice portal 110, a thread may be provide her/him a voice interface to the voice portal 110 and for accessing other options.

In some embodiments of the present invention, an extensible markup language (XML)-style language is used to program applications. Each application is then written in the XML-style language and executed in a thread on the execution engine 202. In some embodiments, an XML-style language such as VoiceXML (or VXML) from the VoiceXML Forum, <http://www.voicexml.org/>, is extended for use by the execution engine 202 in the voice portal 110.

Additionally, the execution engine 202 may access the data connectivity engine 220 for access to database and web sites (e.g. the shared database 112, the web site 230), the evaluation engine 222 for computing tasks and the streaming engine 224 for presentation of streaming media and audio. In one embodiment, the execution engine 220 can be a general purpose computer system and may include an address/data bus for communicating information, one or more central processor(s) coupled with bus for processing information and instructions, a computer readable volatile memory unit (e.g. random access memory, static RAM, dynamic RAM, etc.) coupled with the bus for storing information and instructions for the central processor(s) and a computer readable non-volatile memory unit (e.g. read only memory, programmable ROM, flash memory, EPROM, EEPROM, etc.) coupled with the bus for storing static information and instructions for processor(s).

The execution engine 202 can optionally include a mass storage computer readable data storage device, such as a magnetic or optical disk and disk drive coupled with the bus for storing information and instructions. Optionally, execution engine 202 can also include a display device coupled to the bus for displaying information to the computer user, an alphanumeric input device including alphanumeric and function keys coupled to the bus for communicating information and command selections to central processor(s), a cursor control device coupled to the bus for communicating user input information and command selections to the central processor(s), and a signal input/output device coupled to the bus for communicating messages, command selections, data, etc., to and from processor(s).

The streaming engine 224 of FIG. 1A may allow users of the voice portal 110 to access streaming audio content, or the audio portion of streaming video content, over the telephone interface. For example, a streaming media broadcast from ZDNet™ could be accessed by the streaming engine 224 for playback through the voice portal 110. The streaming engine 224 can act as a streaming content client to a streaming content server, e.g., the streaming engine 224 can act like a RealPlayer software client to receive streaming content broadcasts from a Real Networks server. Additionally, the streaming engine 224 can participate in a streaming content broadcast by acting like a streaming broadcast forwarding server. This second function is particularly useful where multiple users are listening to the same broadcast at the same time (e.g., multiple users may call into the voice portal 110 to listen to the same live streaming broadcast of a company's conference call with the analysts).

The data connectivity engine 220 supports access to a variety of databases including databases accessed across the Internet 106, e.g. the database 228, and also access to web sites over the Internet such as the web site 230. In some embodiments, the data connectivity engine 220 can access standard query language (SQL) databases, open database connectivity databases (ODBC), and/or other types of databases. The shared database 112 is represented separately from the other databases in FIG. 1A; however, the shared database 112 may in fact be part of one of the other databases, e.g. the database 226. Thus the shared database 112 is distinguished from other databases accessed by the voice portal 110 in that it contains user profile information. The data connectivity engine 220 accesses data from more than just databases, websites, and streaming content servers. It also has the ability to be customized to communicate via any number of other protocols or data communication mechanisms.

Having described the hardware and software architecture supporting various embodiments of the invention, the various features provided by different embodiments of the present invention now follow.

Keyword Menu Structure

Figure 1B:
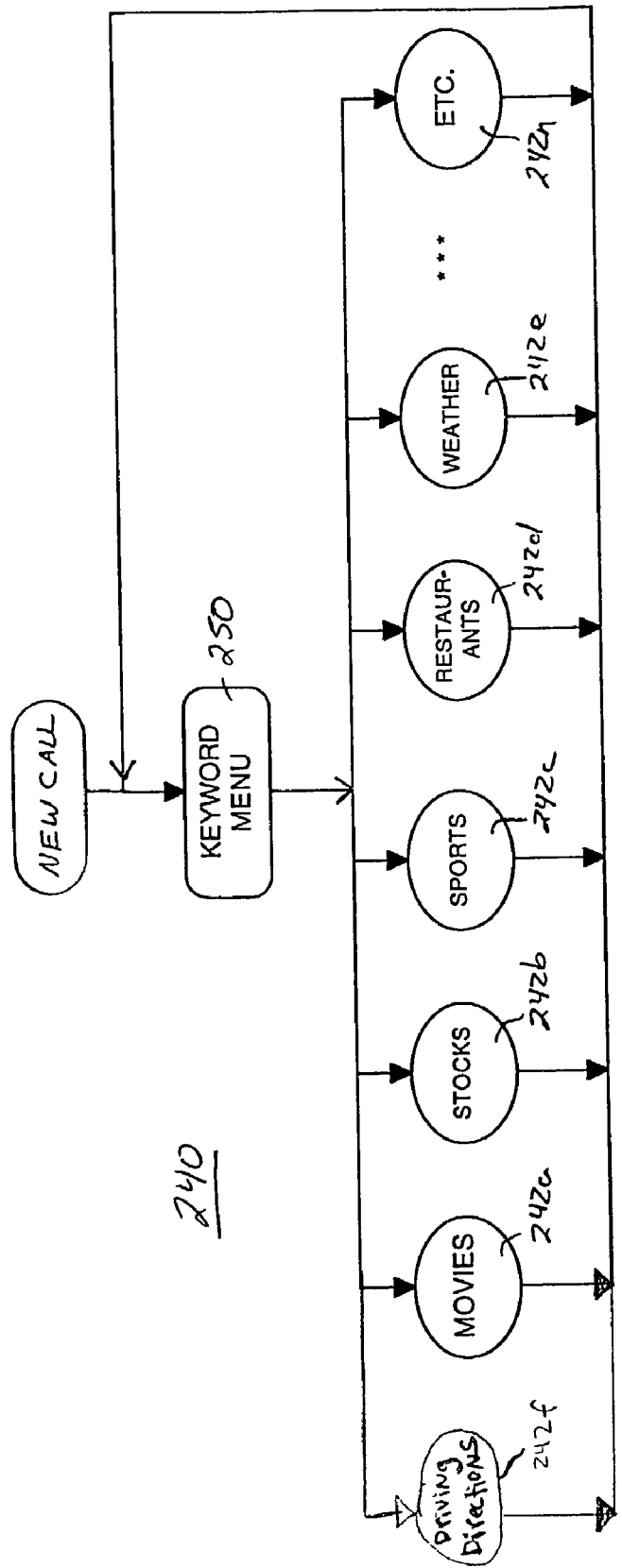
FIG. 1B illustrate a keyword menu structure of the audio user interface of a voice portal 110 in accordance with an embodiment of the present invention, showing the audio driving directions feature.

FIG. 1B illustrates a keyword menu structure 240 of the audio user interface of the voice portal 110 in accordance with an embodiment of the present invention. As shown in FIG. 1B, the menu structure 240 is relatively flat in that a multi-level hierarchical menu structure is not employed. The structure 240 is kept flat in order to facilitate user navigation. From the keyword menu or cue process 250, a number of applications or services 242a-242n can be entered by the user saying a keyword associated with the application, e.g., "movies" causes application 242a to be executed and "driving directions" causes application 242f to be executed. In an embodiment, there are about a dozen different applications that can be selected within the voice portal system 300 (FIG. 1A). The particular applications listed in FIG. 1B are exemplary only and different services can be added and others eliminated within the scope of the present invention. For instance, the movies application 242a gives the user information regarding motion pictures and where they are playing within a selected city. The stocks application 242b gives the user stock quotes based on user selected companies. The driving directions application 242f gives the caller audio driving directions based on caller-provided origin and destination addresses. Any of the applications can be directly entered from the menu cue 250 and each application has its own keyword as show in FIG. 1B. At the completion of an application, the menu cue 250 is entered again. By maintaining a relatively flat menu structure 240, the user can readily navigate through the possible options with little or no required knowledge of where he/she previously has been.

Delivery of Audio Driving Directions

Figure 2:
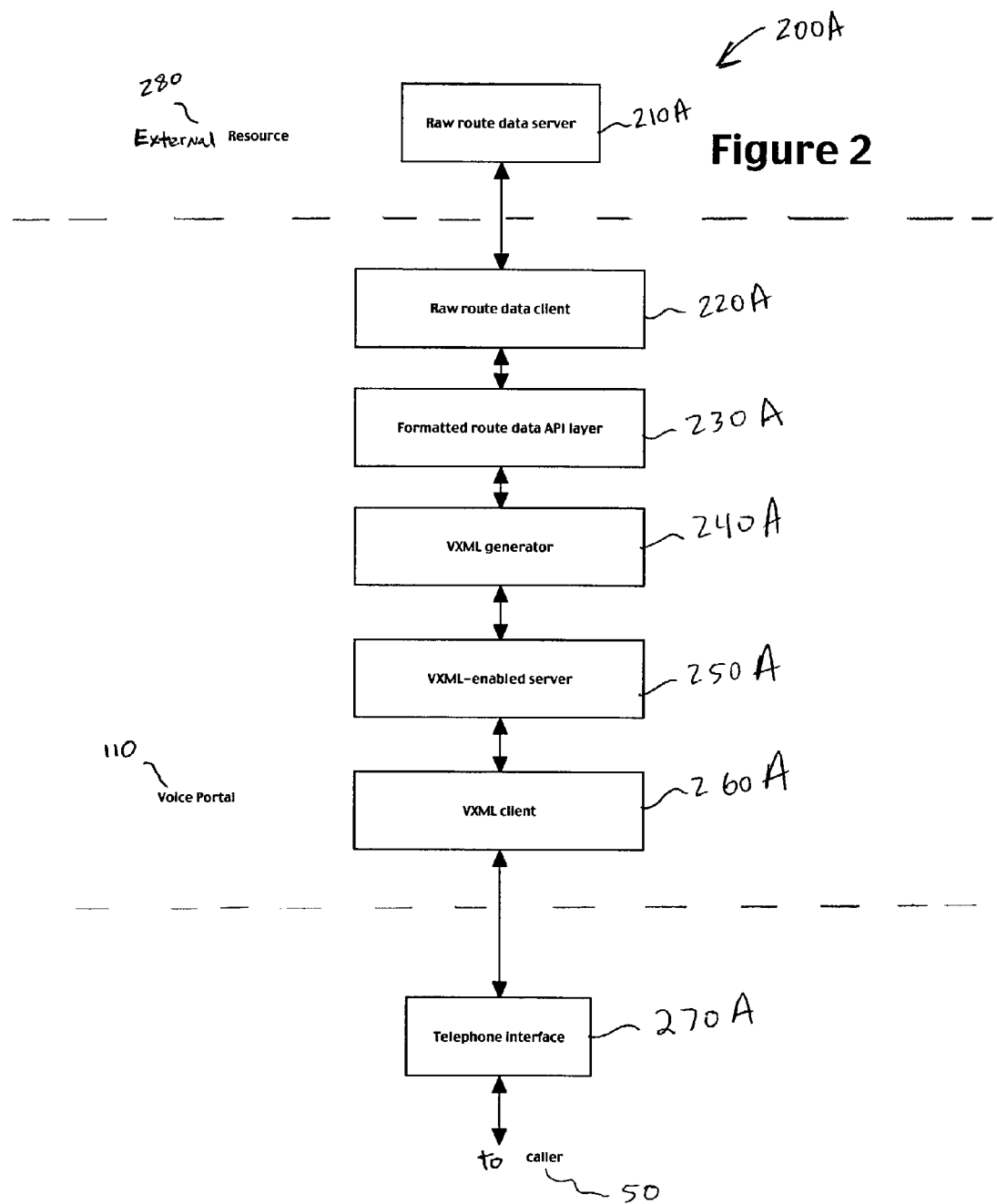
FIG. 2 illustrates a system for delivering audio driving directions in accordance with an embodiment of the present invention.

FIG. 2 illustrates a system 200A for delivering audio driving directions in accordance with an embodiment of the present invention. The system 200A includes a telephone interface 270A, a voice portal 110, and an external resource 280. The telephone interface 270A can include a telephone (e.g., a landline telephone 100 (FIG. 1) or a cellular telephone 101 (FIG. 10, a telephone network 104 (FIG. 1), and a telephone gateway 107 (FIG. 1), whereas the telephone interface 270A was described in detail with respect to FIG. 1. The telephone interface 270A facilitates the delivery of audio driving directions from the voice portal 110 to a caller 50 in response to commands provided by the caller 50 to the voice portal 110 via the telephone interface 270A.

In an embodiment, the voice portal 110 includes a VXML (or Voice Extensible Markup Language) client 260A, a VXML-enabled server 250A, a VXML generator 240A, a formatted route data API layer 230A, and a raw route data client 220A. VXML is designed for creating dynamic, Internet-powered phone applications that feature synthesized speech, digitized audio, recognition of spoken input, and recognition of DTMF (or touch-tone) key input. The voice portal 110 provides an audio user interface to the caller 50 that is user-friendly, enabling the delivery of accurate and clear audio driving directions in a manner that is easy to use and responds quickly to caller-provided requests and entries.

The VXML client 260A provides an audio interface between the voice portal 110 and the telephone interface 270A, enabling the caller to select the audio driving directions feature 242f as described with respect to FIG. 1B. Moreover, the VXML client 260A receives and transmits communications between the caller 50 and the voice portal 110. The VXML-enabled server 250A processes the communications between the caller and the voice portal 110. The VXML generator 240A converts driving directions into an audio format for delivery to the caller 50 via the telephone interface 270A. Generally, the driving directions are comprised of route data (from a caller-provided origin address to a caller-provided destination address) that includes one or more steps. Each step may include direction information, distance information, and time information.

The formatted route data API layer 230A (or route optimizer) formats the raw route data received from the external resource 280, whereas the term "format" includes analyzing and optimizing the raw route data. This formatting is performed to provide the audio driving directions feature of the voice portal 110 with improved performance, manifested in the form of accuracy, clarity, ease-of-use, and speedy delivery in the presentation of audio driving directions to the caller 50. It also minimizes the number of problems since it reduces the street names to a canonical form which increases the likelihood that an appropriate audio data can be found for the street names.

The raw route data client 220A interfaces with the external resource 280 (e.g., an external database). The external resource 280 includes a raw route data server 210A for generating the raw route data based on information provided by the raw route data client 220A. In an embodiment, the raw route data server 210A is implemented in a Web site accessible via the Internet. In particular, the raw route data client 220A transmits the caller-provided origin address and destination address to the raw route data server 210A and receives the raw route data that is based on the caller-provided origin address and destination address.

Figure 3:
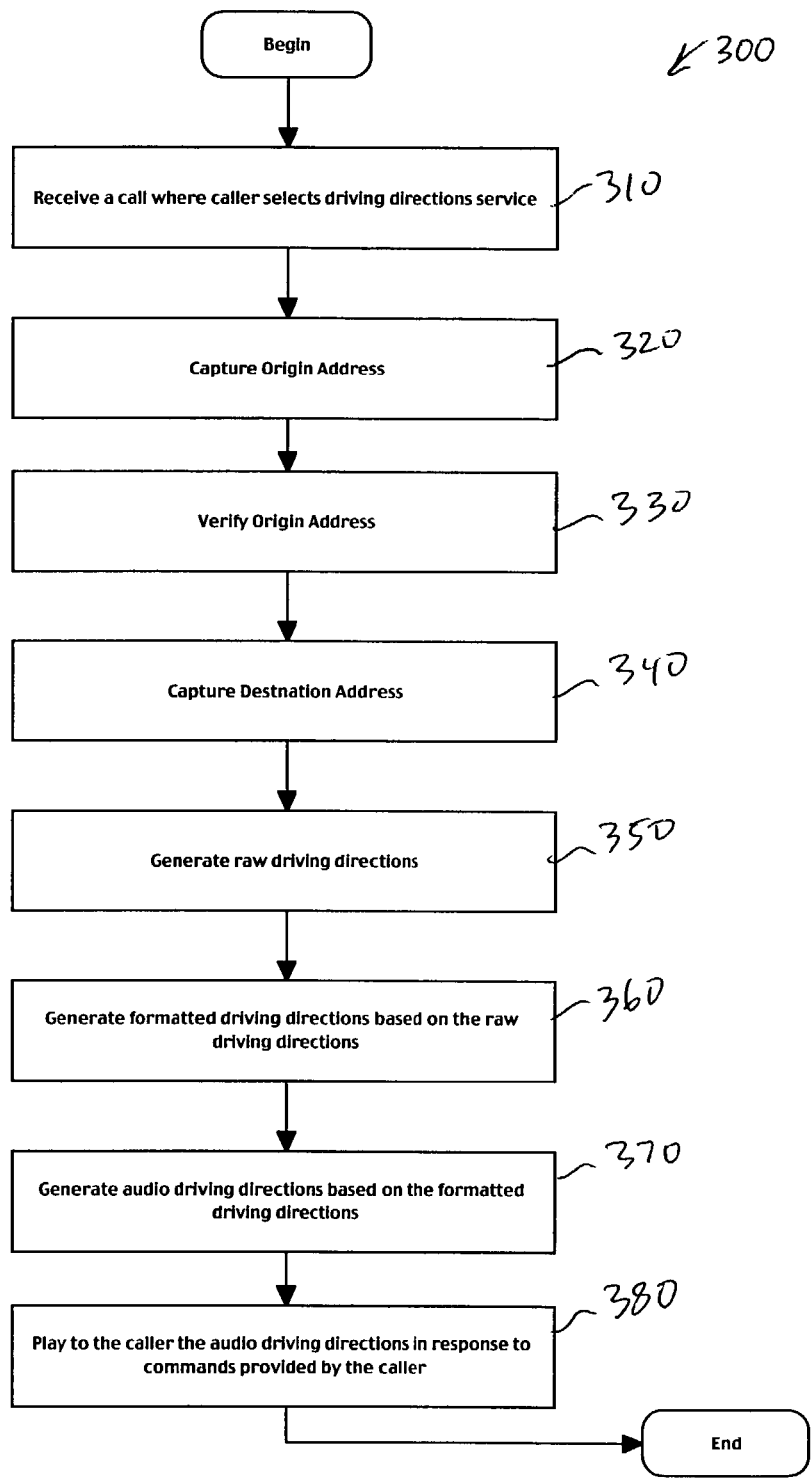
FIG. 3 illustrates a flow chart showing a method of delivering audio driving directions in accordance with an embodiment of the present invention.

FIG. 3 illustrates a flow chart showing a method 300 of delivering audio driving directions in accordance with an embodiment of the present invention. Reference is made to FIGS. 1-2. In particular, the voice portal 110 (FIG. 2) delivers audio driving directions to a caller 50 in response to commands provided by the caller 50 via the telephone interface 270A.

At Block 310, the voice portal 110 receives a call where the caller 50 selects the audio driving directions feature (or service) 240f (FIG. 1B) from a menu of available features or services. For example, the caller 50 selects the audio driving directions feature 240f (FIG. 1B) by providing the utterance "driving directions" or by pressing one or more touch-tone keys corresponding to the audio driving directions feature 240f (FIG. 1B).

Figure 6:
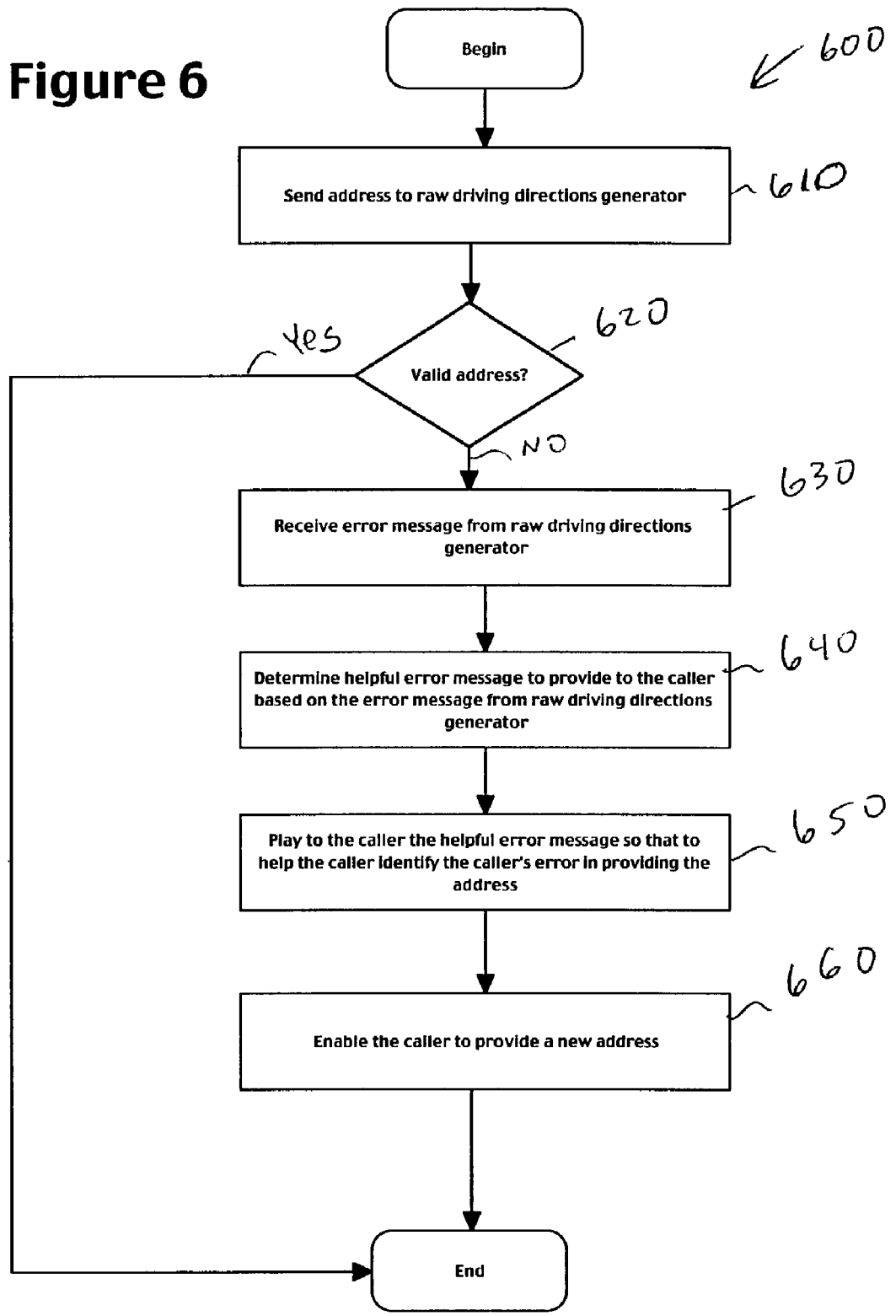
FIG. 6 illustrates a flow chart showing a method of verifying address received from a caller in accordance with an embodiment of the present invention.

Moreover, at Block 320, the voice portal 110 executes its audio user interface to capture the origin address from the caller 50. FIG. 4 provides additional details about the execution of Block 320. Continuing, at Block 330, the voice portal 110 verifies the origin address by communicating with the external resource 280. FIG. 6 provides additional details about the execution of Block 330.

Figure 7:
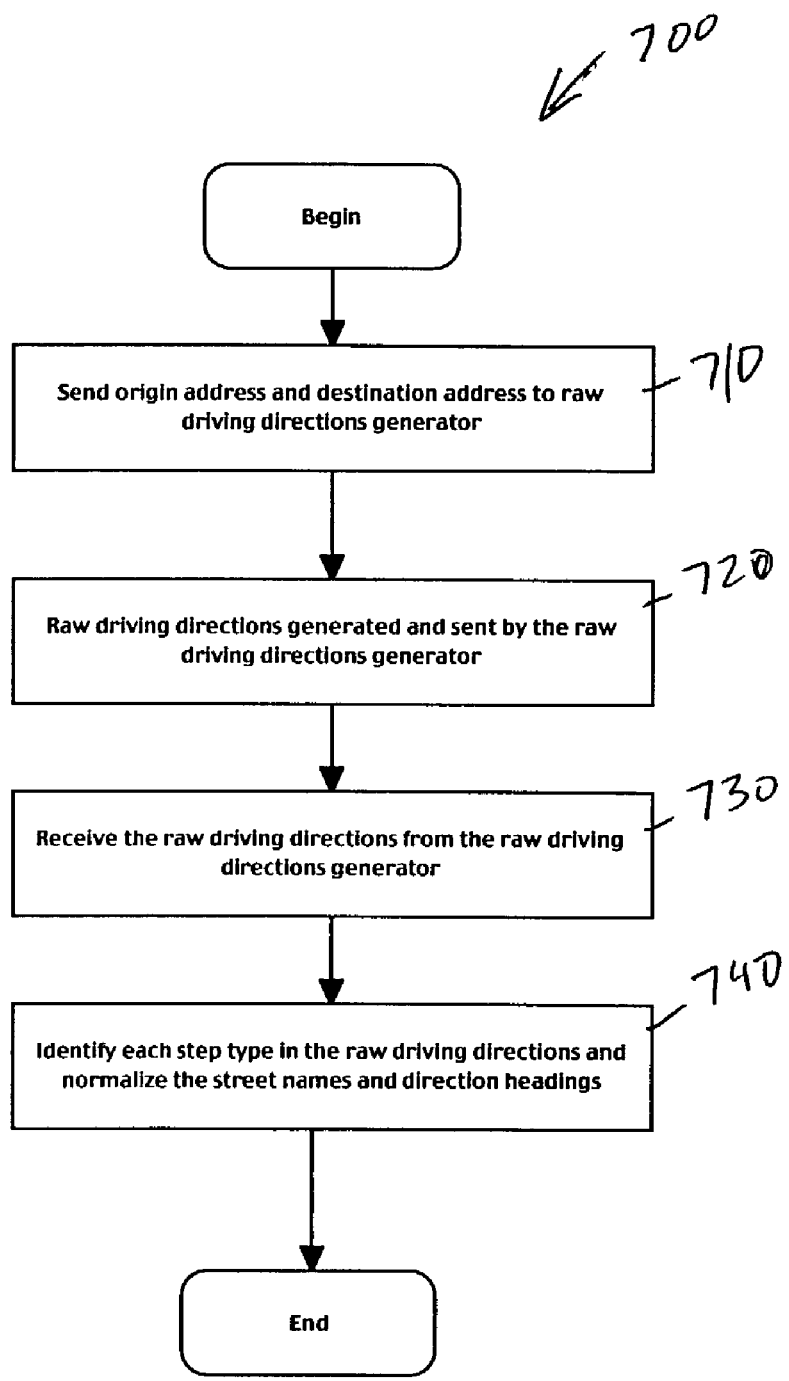
FIG. 7 illustrates a flow chart showing a method of generating raw driving directions in accordance with an embodiment of the present invention.

At Block 340, the voice portal 110 executes its audio user interface to capture the destination address from the caller 50. FIG. 4 provides additional details about the execution of Block 340. Additionally, at Block 350, the raw driving directions are generated. In particular, the voice portal 110 transmits the caller-provided origin and destination addresses to the external resource 280, which then generates the raw driving directions based on the caller-provided origin and destination addresses. The raw driving directions are textual and are comprised of raw route data (from a caller-provided origin address to a caller-provided destination address) that includes one or more steps. Each step may include direction information, distance information, and time information. Since the raw driving directions can be confusing, long, and unclear, the raw driving directions require additional processing to satisfy the caller's expectation of accuracy, clarity, ease-of-use, and speedy delivery from the audio driving directions feature. The external resource 280 transmits the raw driving directions to the voice portal 110. FIG. 7 provides additional details about the execution of Block 350.

Furthermore, at Block 360, the voice portal 110 generates formatted driving directions based on the raw driving directions received from the external resource 280. FIG. 8 provides additional details about the execution of Block 360.

Figure 9:
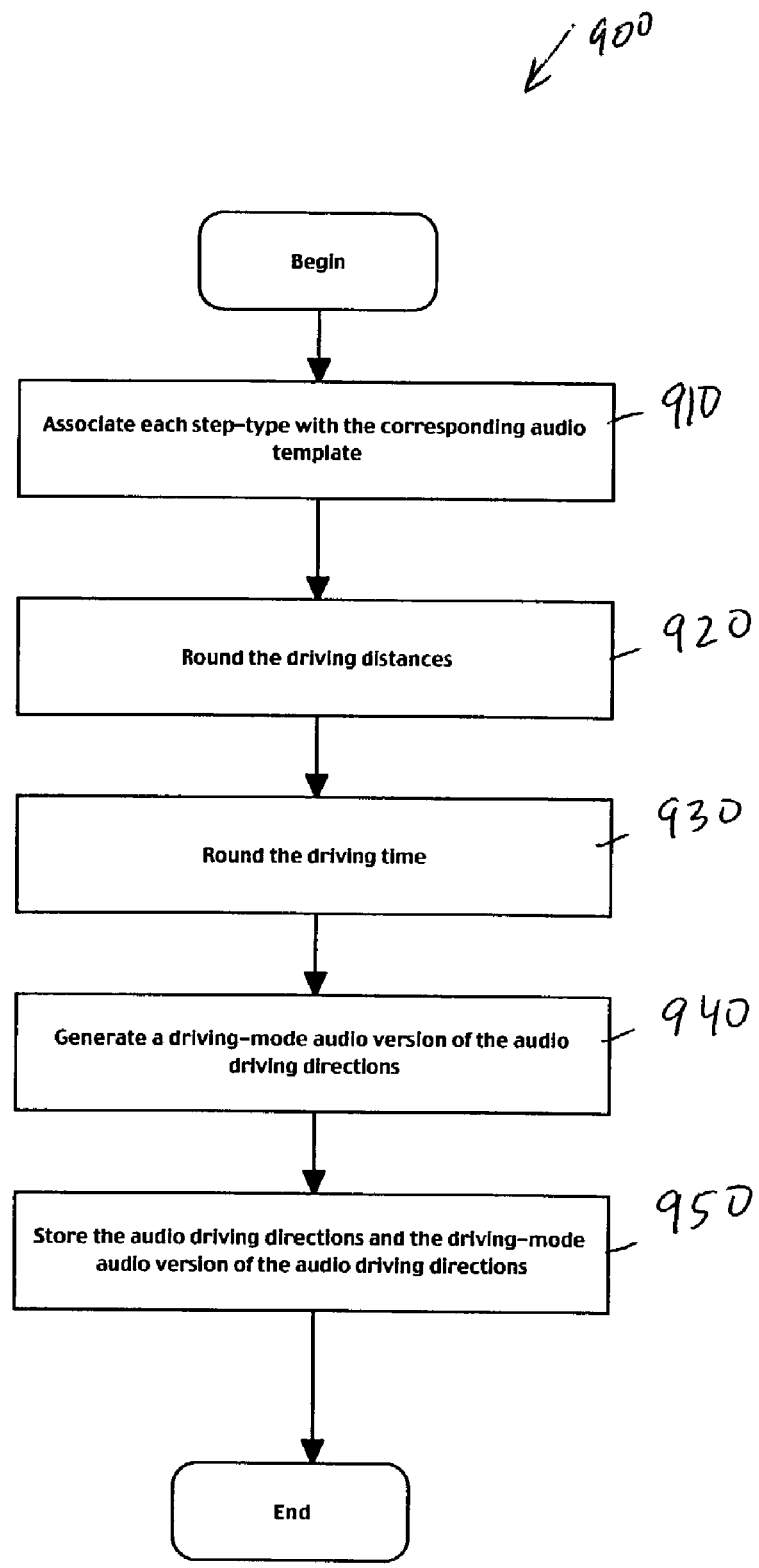
FIG. 9 illustrates a flow chart showing a method of generating audio driving directions in accordance with an embodiment of the present invention.

At Block 370, the voice portal 110 generates audio driving directions based on the formatted driving directions. FIG. 9 provides additional details about the execution of Block 370. Moreover, at Block 380, the voice portal 110 plays to the caller 50 the audio driving directions in response to commands provided by the caller 50. FIG. 10 provides additional details about the execution of Block 380.

FIG. 4 illustrates a flow chart showing a method 400 of capturing addresses from a caller in accordance with an embodiment of the present invention. FIG. 4 provides additional details about the execution of Block 320 and Block 340 (FIG. 3). Reference is made to FIGS. 1-3.

Figure 4A:
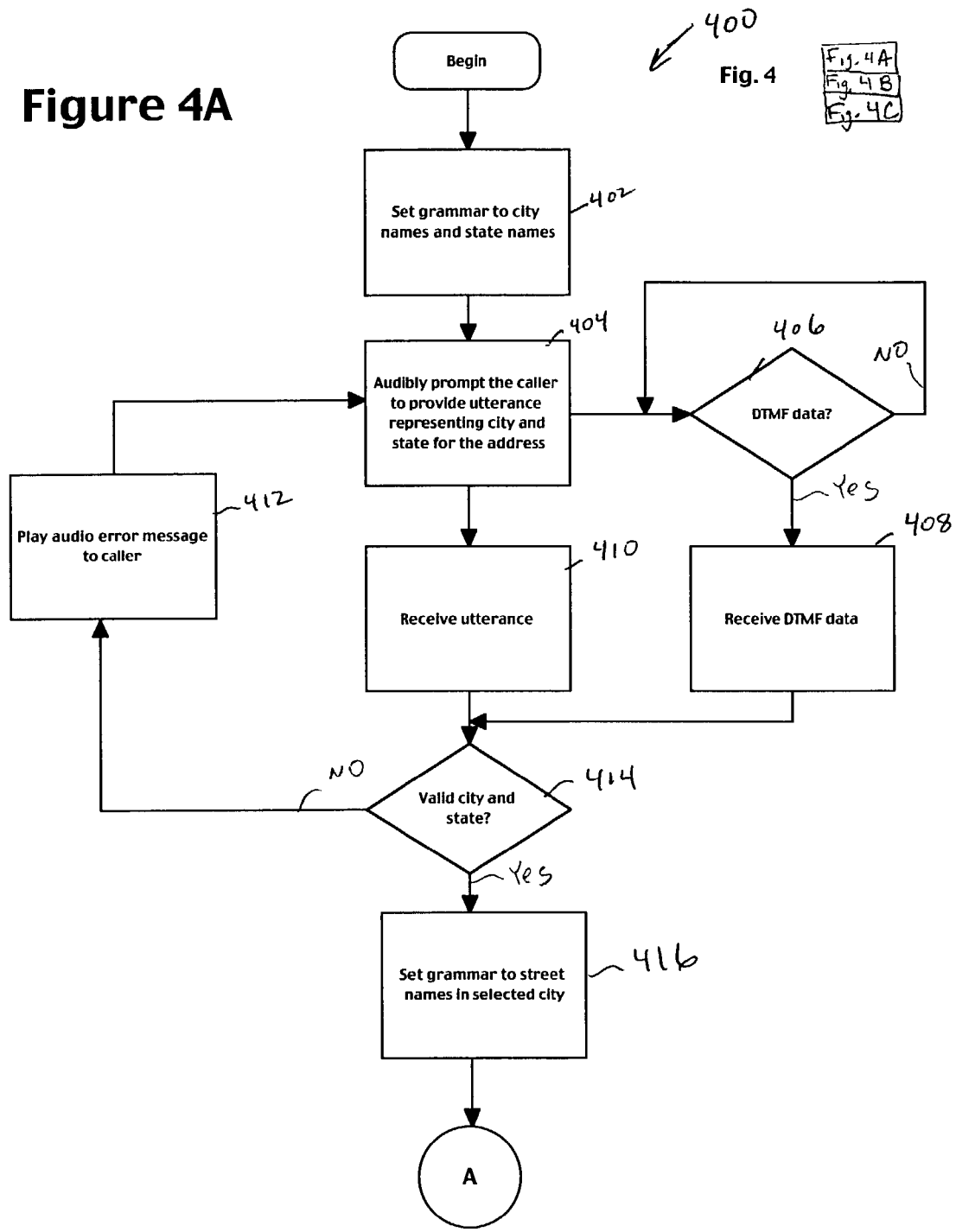
FIG. 4 illustrates a flow chart showing a method of capturing addresses from a caller in accordance with an embodiment of the present invention.

Referring to FIG. 4A, at Block 402, the voice portal 110 sets the grammar to city names and state names. The grammar defines the set of valid expressions that a caller can utter when interacting with the voice portal 110. At Block 404, the voice portal 110 audibly prompts the caller 50 to provide an utterance representing the city and state for the address (e.g., origin address or destination address). Rather than providing an utterance, the caller 50 may spell the city and state using the keys on the telephone touch pad. Moreover, at Block 406, the voice portal 110 monitors the input from the caller 50 to detect DTMF (Dual Tone Multi-Frequency) data (or touch-tone data) transmitted when the caller 50 presses a key on a telephone touch pad. If the voice portal 110 detects DTMF data, at Block 408 the voice portal 110 receives the DTMF data from the caller 50.

Otherwise, at Block 410, the voice portal 110 receives the utterance representing the city and state for the address (e.g., origin address or destination address) from the caller 50. Continuing, at Block 414, the voice portal 110 determines whether the utterance (or the DTMF data) represents a valid city and state. If the utterance (or the DTMF data) represents an invalid city or an invalid state, at Block 412 the voice portal 110 plays an audio error message to the caller 50 and then proceeds to Block 404, whereas the audio error message provides the caller with information about the error that occurred. If the utterance (or the DTMF data) represents a valid city and state, at Block 416 the voice portal 110 sets the grammar to street names in the caller-provided (or selected by the caller) city. Alternatively, the voice portal 110 can confirm the caller's input by playing to the caller 50 an audio representation of the city for the address as confirmation.

Figure 4B:
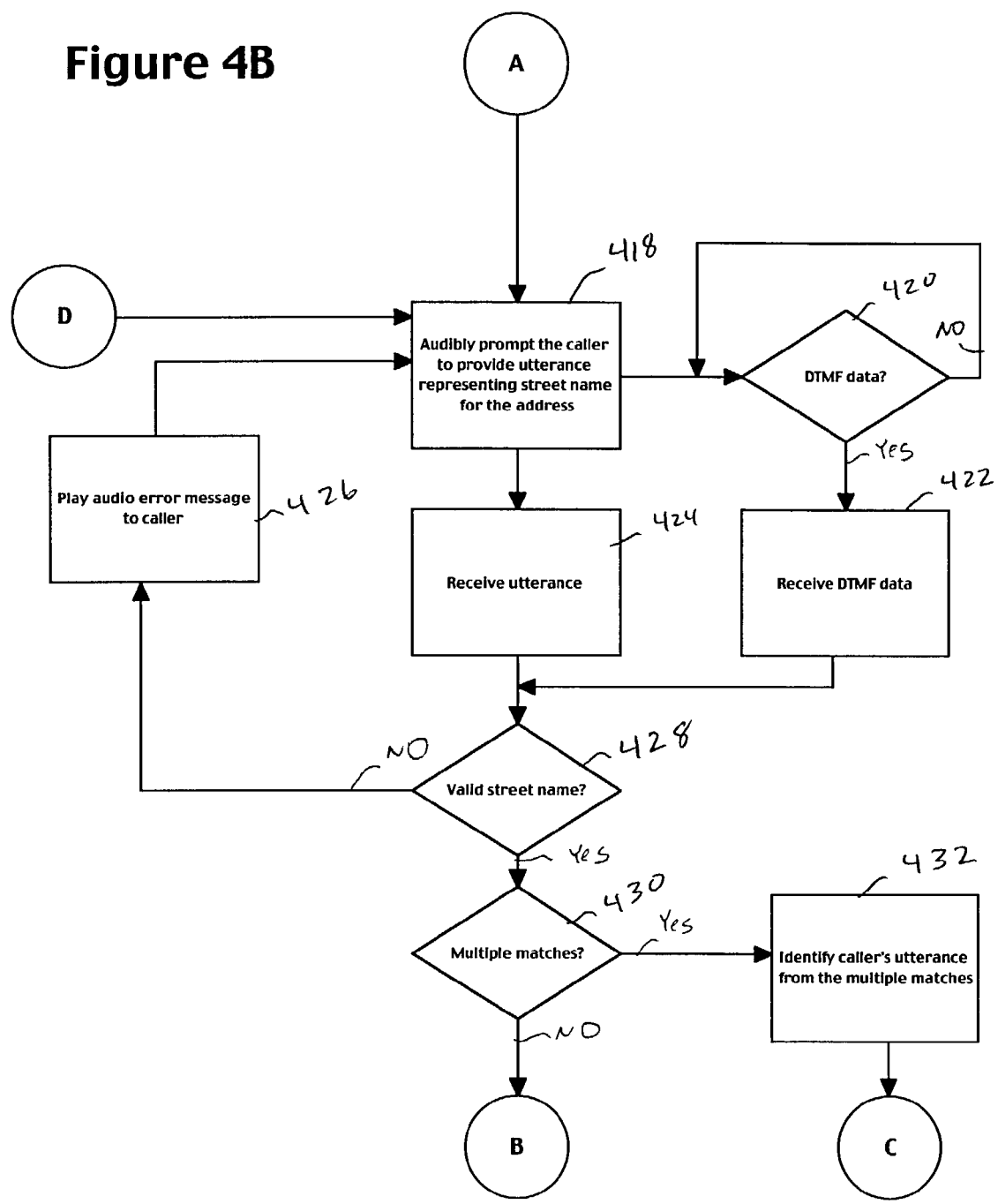

Referring to FIG. 4B, at Block 418, the voice portal 110 audibly prompts the caller 50 to provide an utterance representing the street name for the address (e.g., origin address or destination address). Rather than providing an utterance, the caller 50 may spell the street name using the keys on the telephone touch pad. Moreover, at Block 420, the voice portal 110 monitors the input from the caller 50 to detect DTMF (Dual Tone Multi-Frequency) data (or touch-tone data) transmitted when the caller 50 presses a key on a telephone touch pad. If the voice portal 110 detects DTMF data, at Block 422 the voice portal 110 receives the DTMF data from the caller 50.

Otherwise, at Block 424, the voice portal 110 receives the utterance representing the street name for the address (e.g., origin address or destination address) from the caller 50. Continuing, at Block 428, the voice portal 110 determines whether the utterance (or the DTMF data) represents a valid street name. If the utterance (or the DTMF data) represents an invalid street name, at Block 426 the voice portal 110 plays an audio error message to the caller 50 and then proceeds to Block 418, whereas the audio error message provides the caller with information about the error that occurred.

Figure 5:
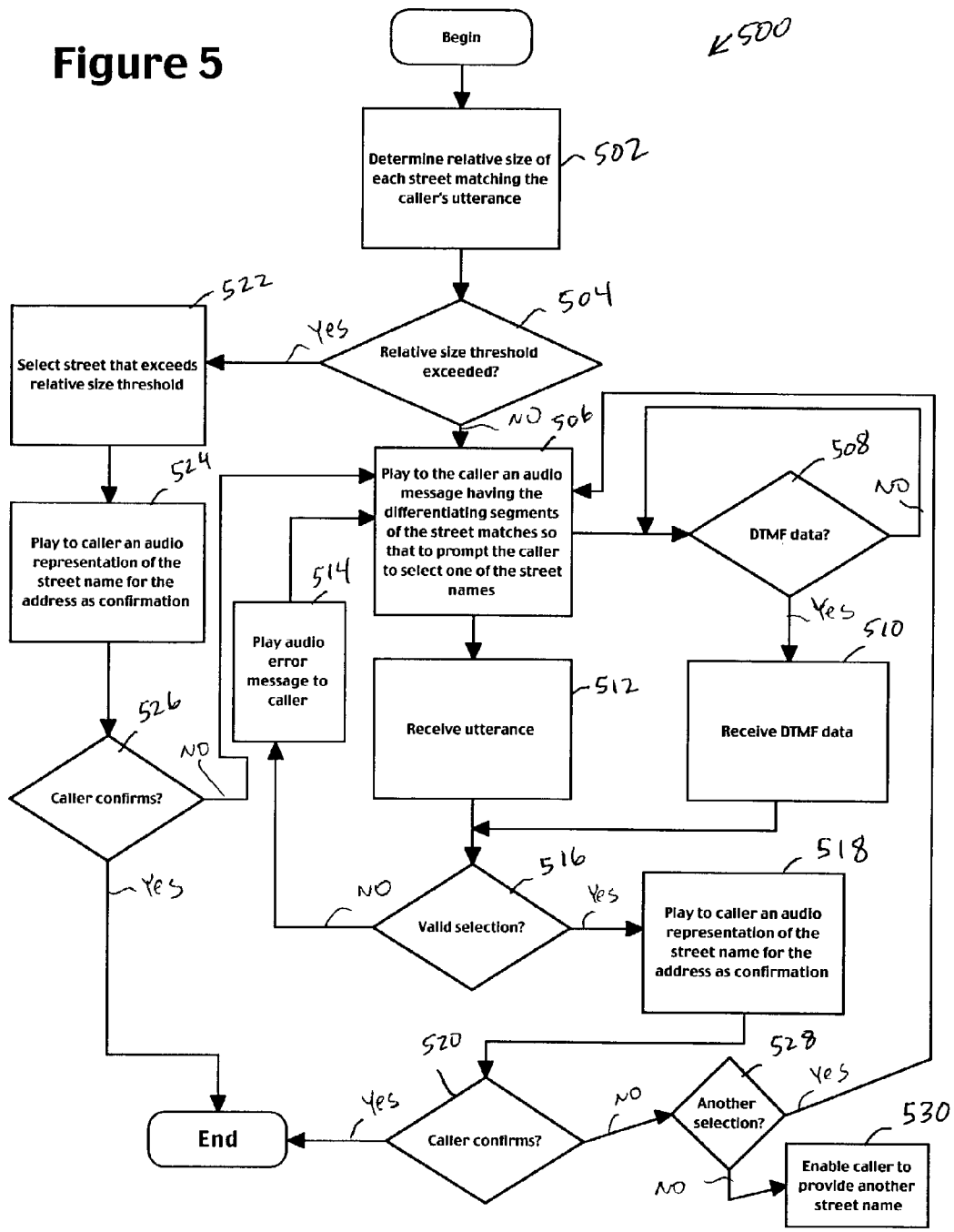
FIG. 5 illustrates a flow chart showing a method of identifying caller's street name utterances from multiple matches in accordance with an embodiment of the present invention.

If the utterance (or the DTMF data) represents a valid street name, at Block 430 the voice portal 110 determines whether the utterance (or the DTMF data) matches multiple valid street names. If the utterance (or the DTMF data) matches multiple valid street names, at Block 432 the voice portal 110 proceeds to identify the caller's utterance from the multiple matches of valid street names and then proceeds to Block 438. FIG. 5 provides additional details about the execution of Block 432.

Figure 4C:
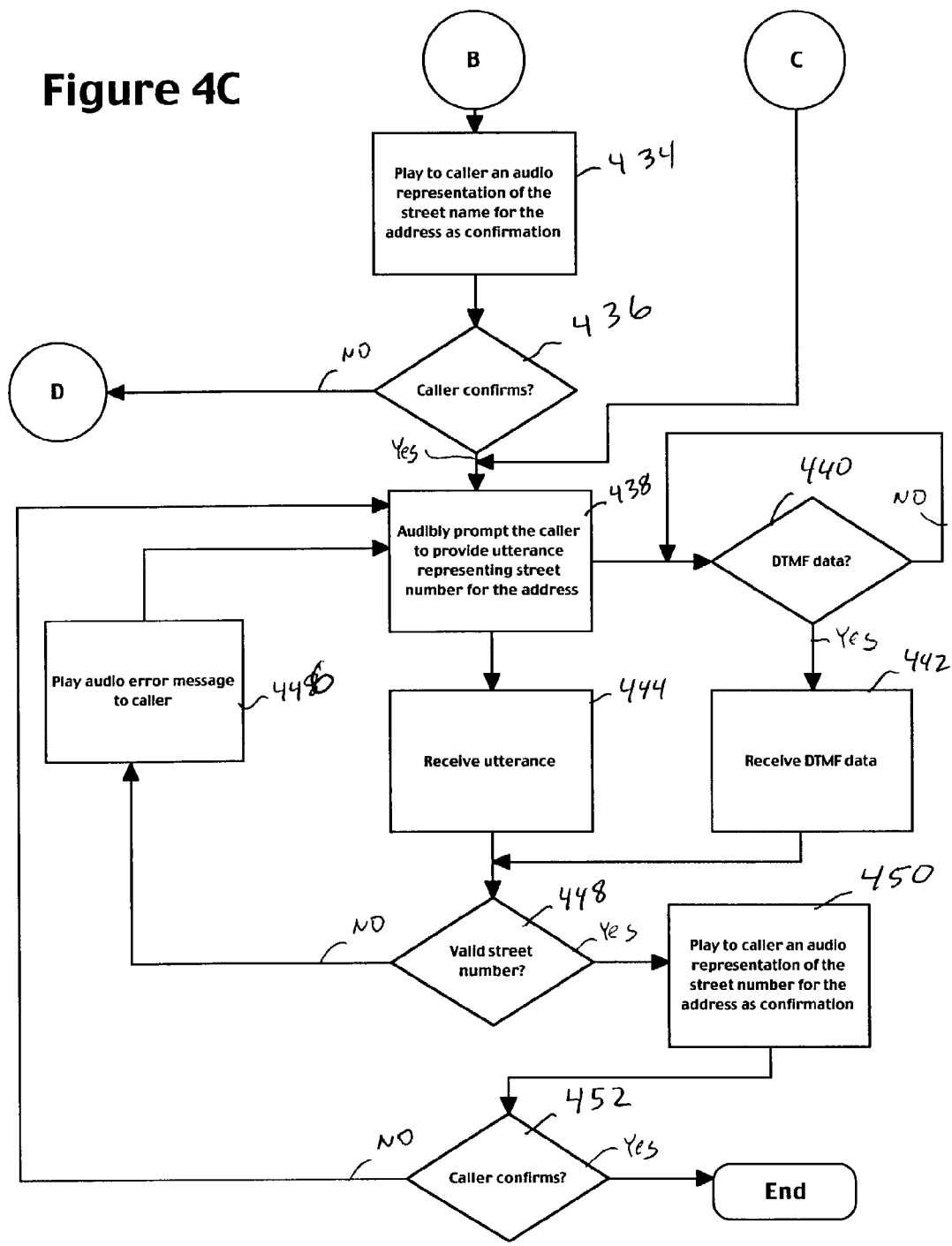

Now referring to FIG. 4C. At Block 434, the voice portal 110 plays to the caller 50 an audio representation of the street name for the address as confirmation. At Block 436, the caller 50 can confirm the street name determined by the voice portal 110. If the caller 50 does not confirm the street name determined by the voice portal 110, the voice portal 110 proceeds to Block 418. The caller 50 may input another street name if the caller 50 desires to provide an intersection as an address.

Otherwise, at Block 438 the voice portal 110 sets the grammar to street numbers. Moreover, at Block 438, the voice portal 110 audibly prompts the caller 50 to provide an utterance representing the street number for the address (e.g., origin address or destination address). Rather than providing an utterance, the caller 50 may input the street number using the keys on the telephone touch pad. Moreover, at Block 440, the voice portal 110 monitors the input from the caller 50 to detect DTMF (Dual Tone Multi-Frequency) data (or touch-tone data) transmitted when the caller 50 presses a key on a telephone touch pad. If the voice portal 110 detects DTMF data, at Block 442 the voice portal 110 receives the DTMF data from the caller 50.

Otherwise, at Block 444, the voice portal 110 receives the utterance representing the street number for the address (e.g., origin address or destination address) from the caller 50. Continuing, at Block 448, the voice portal 110 determines whether the utterance (or the DTMF data) represents a valid street number. If the utterance (or the DTMF data) represents an invalid street number, at Block 446 the voice portal 110 plays an audio error message to the caller 50 and then proceeds to Block 438, whereas the audio error message provides the caller with information about the error that occurred.

If the utterance (or the DTMF data) represents a valid street number, at Block 450 the voice portal 110 plays to the caller 50 an audio representation of the street number for the address as confirmation. At Block 452, the caller 50 can confirm the street number determined by the voice portal 110. If the caller 50 does not confirm the street number determined by the voice portal 110, the voice portal 110 proceeds to Block 438.

FIG. 5 illustrates a flow chart showing a method 500 of identifying caller's street name utterances from multiple matches in accordance with an embodiment of the present invention. FIG. 5 provides additional details about the execution of Block 432 (FIG. 4B). Reference is made to FIGS. 1-4.

At Block 502, the voice portal 110 determines the relative size of each street name matching the caller's utterance by determining the quantity of street numbers associated with each street name matching the caller's utterance. Continuing at Block 504, the voice portal 110 determines whether a relative size threshold is exceeded by the quantity of street numbers associated with any of the street names matching the caller's utterance. If the relative size threshold is exceeded by the quantity of street numbers associated with a particular street name matching the caller's utterance, at Block 522 the voice portal 110 selects the particular street that exceeds the relative size threshold. At Block 524, the voice portal 110 plays to the caller 50 an audio representation of the street name for the address as confirmation. At Block 526, the caller 50 can confirm the street name selected by the voice portal 110. If the caller 50 does not confirm the street name determined by the voice portal 110, the voice portal 110 proceeds to Block 506.

If the relative size threshold is not exceeded by the quantity of street numbers associated with any of the street names matching the caller's utterance, at Block 506 the voice portal 110 plays to the caller 50 an audio message having the differentiating segments of the street names matching the caller's utterance so that to prompt the caller 50 to select one of the street names. For example, the differentiating segments may be a prefix such as "North", "South", "East", or "West". The differentiating segments may be a suffix such as "Avenue", "Street", "Lane", etc. Additionally, the differentiating segments may be an actual street name. Rather than providing an utterance, the caller 50 may input a response by using the keys on the telephone touch pad. Moreover, at Block 508, the voice portal 110 monitors the input from the caller 50 to detect DTMF (Dual Tone Multi-Frequency) data (or touch-tone data) transmitted when the caller 50 presses a key on a telephone touch pad. If the voice portal 110 detects DTMF data, at Block 510 the voice portal 110 receives the DTMF data from the caller 50.

Otherwise, at Block 512, the voice portal 110 receives the utterance from the caller 50. Continuing, at Block 516, the voice portal 110 determines whether the utterance (or the DTMF data) is valid. If the utterance (or the DTMF data) is invalid, at Block 514 the voice portal 110 plays an audio error message to the caller 50 and then proceeds to Block 506, whereas the audio error message provides the caller 50 with information about the error that occurred.

If the utterance (or the DTMF data) is valid, at Block 518 the voice portal 110 plays to the caller 50 an audio representation of the street name for the address as confirmation. At Block 520, the caller 50 can confirm the street name determined by the voice portal 110. If the caller 50 does not confirm the street name determined by the voice portal 110, the voice portal 110 proceeds to Block 528. At Block 528, the voice portal 110 determines whether there are other street names matching the caller's utterance. If there are other street names matching the caller's utterance, the voice portal 110 proceeds to Block 506. Otherwise, the voice portal 110 enables the caller 50 to provide another street name as described above with respect to Blocks 416-436 (FIGS. 4B-4C)

FIG. 6 illustrates a flow chart showing a method 600 of verifying address received from a caller in accordance with an embodiment of the present invention. FIG. 6 provides additional details about the execution of Block 330 (FIG. 3). Reference is made to FIGS. 1-3.

At Block 610, the voice portal 110 transmits the address (e.g., origin address or destination address) to the external resource 280, which generates the raw driving directions. At Block 620, the external resource 280 determines whether the address is valid and notifies the voice portal 110. If the address is valid, the voice portal 110 continues interfacing with the caller to deliver the audio driving directions.

If the address is invalid, at Block 630 the voice portal 110 receives an error message from the external resource 280. Continuing at Block 640, the voice portal 110 determines a helpful error message to provide to the caller based on the error message received from the external resource 280. For example, the helpful error message may provide information on whether the caller provided erroneous input with respect to the city, the street name, the street number, etc. of the address.

Furthermore, at Block 650, the voice portal 110 plays to the caller 50 the helpful error message so that to help the caller 50 identify the caller's error in providing the address. At Block 660, the voice portal 110 enables the caller 50 to provide a new address as described with respect to FIG. 4.

FIG. 7 illustrates a flow chart showing a method 700 of generating raw driving directions in accordance with an embodiment of the present invention. FIG. 7 provides additional details about the execution of Block 350 (FIG. 3). Reference is made to FIGS. 1-3.

At Block 710, the voice portal 110 sends the origin address and the destination address to the external resource 280, which generates the raw driving directions. Moreover, at Block 720, the external resource 280 generates the raw driving directions based on the origin and destination addresses and sends them to the voice portal 110. The raw driving directions are textual and are comprised of raw route data (from a caller-provided origin address to a caller-provided destination address) that includes one or more steps (or maneuvers). Each step (or maneuver) may include direction information, distance information, and time information. Since the raw driving directions can be confusing, long, and unclear, the raw driving directions require additional processing to satisfy the caller's expectation of accuracy, clarity, ease-of-use, and speedy delivery from the audio driving directions feature.

Continuing at Block 730, the voice portal 110 receives the raw driving directions. At Block 740, the voice portal 110 identifies each step type in the raw driving directions. Moreover, the voice portal 110 normalizes the street names and the direction heading within each step, whereas each step has a number. There are numerous step types. For example, a merge-type step has the form "Merge onto . . . ". A turn-type step has the form "Turn Left/Right onto . . . ". An "exit ramp"-type step has the form "Take . . . exit ramp". An "on ramp"-type step has the form "Take . . . on ramp". A "stay straight"-type step has the form "Stay straight . . . ".

FIG. 8 illustrates a flow chart showing a method 800 of generating formatted driving directions in accordance with an embodiment of the present invention. FIG. 8 provides additional details about the execution of Block 360 (FIG. 3). Reference is made to FIGS. 1-3.

Figure 8A:
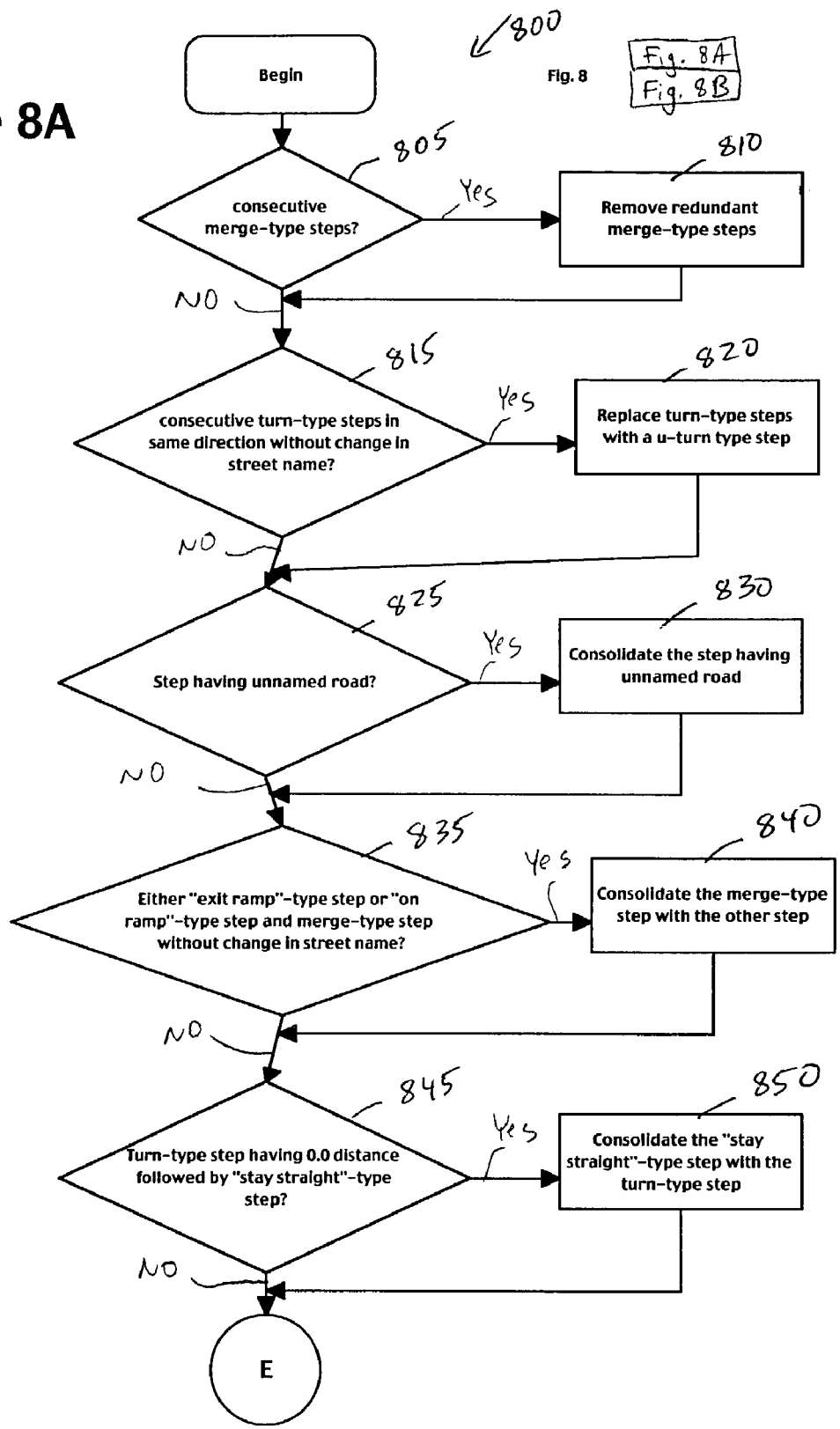
FIG. 8 illustrates a flow chart showing a method of generating formatted driving directions in accordance with an embodiment of the present invention.

Referring to FIG. 8A, at Block 805, the voice portal 110 determines whether the raw driving directions have consecutive merge-type steps. If the raw driving directions have consecutive merge-type steps, at Block 810 the voice portal 110 removes the redundant merge-type steps, but adds the driving distance and driving duration (or driving time) values of the removed step to a preceding step or a next step.

At Block 815, the voice portal 110 determines whether the raw driving directions have consecutive turn-type steps in the same direction without change in street name. If the raw driving directions have consecutive turn-type steps in the same direction without change in street name, at Block 820 the voice portal 110 replaces the turn-type steps with a U turn-type step.

At Block 825, the voice portal 110 determines whether the raw driving directions have a step having an unnamed road. If the raw driving directions have a step having an unnamed road, at Block 830 the voice portal 110 consolidates (or combines) the step having the unnamed road with another step.

Continuing, at Block 835, the voice portal 110 determines whether the raw driving directions have either "exit ramp"-type step or "on ramp"-type step and merge-type step without change in street name. If the raw driving directions have either "exit ramp"-type step or "on ramp"-type step and merge-type step without change in street name, at Block 840 the voice portal 110 consolidates the merge-type step with the other step.

Furthermore, at Block 845, the voice portal 110 determines whether the raw driving directions have a turn-type step having 0.0 distance followed by a "stay straight"-type step. If the raw driving directions have a turn-type step having 0.0 distance followed by a "stay straight"-type step, at Block 850 the voice portal 110 consolidates the "stay straight"-type step with the turn-type step.

Figure 8B:
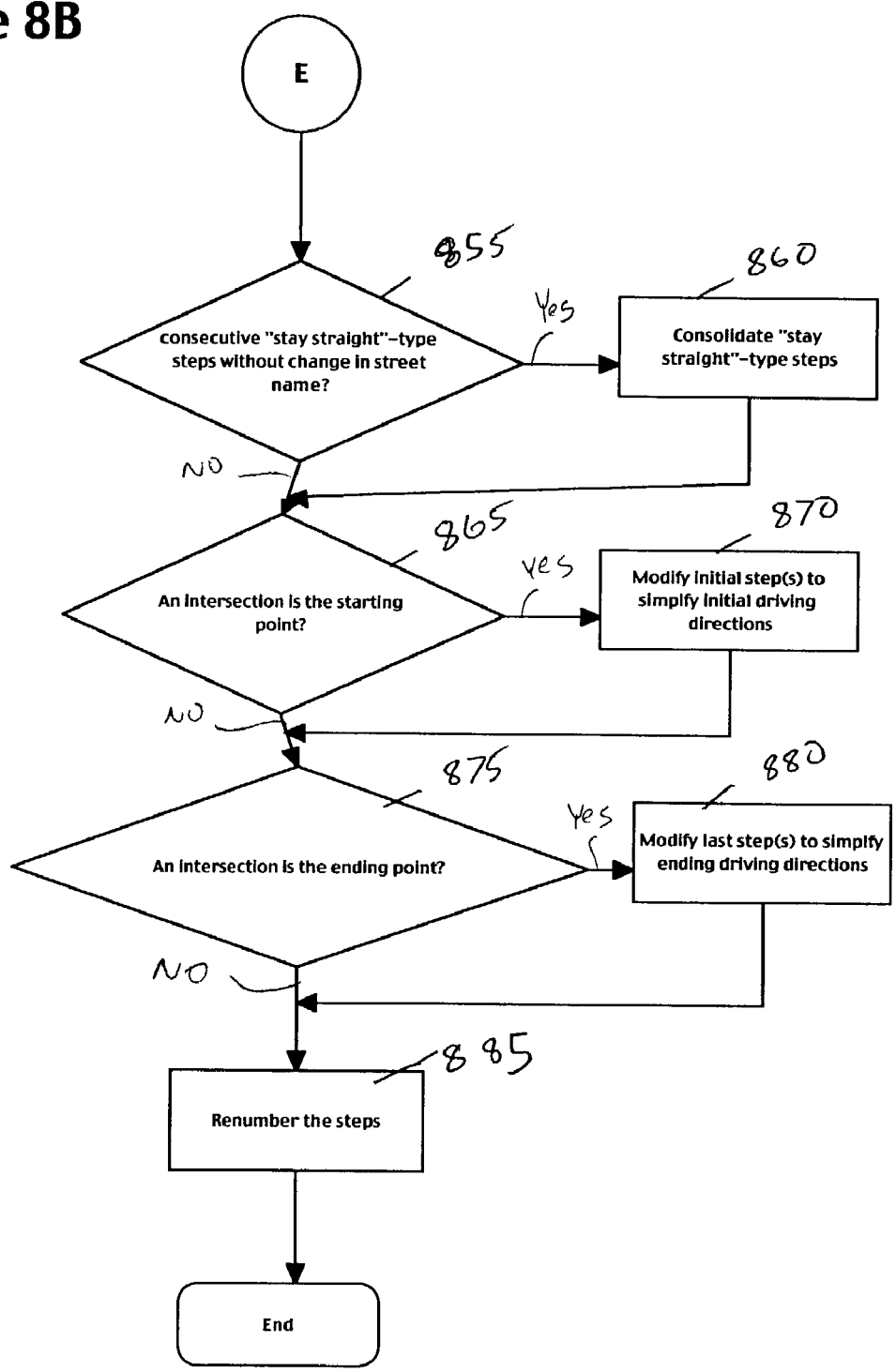

Referring to FIG. 8B, at Block 855, the voice portal 110 determines whether the raw driving directions have consecutive "stay straight'-type steps without change in street name.

If the raw driving directions have consecutive "stay straight"-type steps without change in street name, at Block 860 the voice portal 110 consolidates the "stay straight"-type steps.

At Block 865, the voice portal 110 determines whether an intersection is the starting point. If an intersection is the starting point, at Block 870 the voice portal 110 modifies the initial step or steps to simplify the initial raw driving directions.

Furthermore, at Block 875, the voice portal 110 determines whether an intersection is the ending point. If an intersection is the ending point, at Block 880 the voice portal 110 modifies the last step or steps to simplify the ending raw driving directions.

At Block 885, the voice portal 110 renumbers the steps of the raw driving directions to form the formatted driving directions based on the raw driving directions.

FIG. 9 illustrates a flow chart showing a method of generating audio driving directions in accordance with an embodiment of the present invention. FIG. 9 provides additional details about the execution of Block 370 (FIG. 3). Reference is made to FIGS. 1-3.

At Block 910, the voice portal 110 associates each step-type of the formatted driving directions with a corresponding audio template. At Block 920, the voice portal 110 rounds the driving distances of each step. Moreover, at Block 930, the voice portal 110 rounds the driving time of each step. Furthermore, at Block 940, the voice portal 110 generates a driving-mode audio version of the audio driving directions. The driving-mode audio version of the audio driving directions presents the steps in a manner that is convenient to a caller that is driving. Typically, the steps of the audio driving directions are presented in the form such as (maneuver) and then (distance). The steps of the driving-mode audio version are presented in the form such as (distance) and then (maneuver).

Additionally, at Block 950, the voice portal 110 stores the audio driving directions and the driving-mode audio version of the audio driving directions.

FIG. 10 illustrates a flow chart showing a method 1000 of playing to a caller the audio driving directions in accordance with an embodiment of the present invention. FIG. 10 provides additional details about the execution of Block 380 (FIG. 3). Reference is made to FIGS. 1-3.

At Block 1010, the voice portal 110 plays to the caller 50 an audio overview of the trip from the origin address to the destination address. Moreover, at Block 1020, the voice portal 110 plays an audio representation of a step from the audio driving directions.

Continuing at Block 1030, the voice portal 110 determines whether the caller 50 has provided a command to navigate through the audio driving directions feature. There is a plurality of commands that the caller 50 can input to navigate though the audio driving directions. The caller 50 inputs a command by providing an utterance corresponding to a particular command or by pressing one or more touch-tone keys corresponding to the particular command. If the voice portal 110 detects a command from the caller 50, at Block 1040 the voice portal 1040 responds to the command received from the caller 50. FIG. 11 provides additional details about the execution of Block 1040.

Furthermore, at Block 1050, the voice portal 110 determines whether the caller 50 desires to continue the audio driving directions. If the caller 50 desires to continue the audio driving directions, the voice portal proceeds to Block 1030.

FIG. 11 illustrates a flow chart showing a method 1100 of responding to commands provided by a caller during delivery of audio driving directions in accordance with an embodiment of the present invention. FIG. 11 provides additional details about the execution of Block 1040 (FIG. 10). Reference is made to FIGS. 1-3 and 10.

Figure 11A:
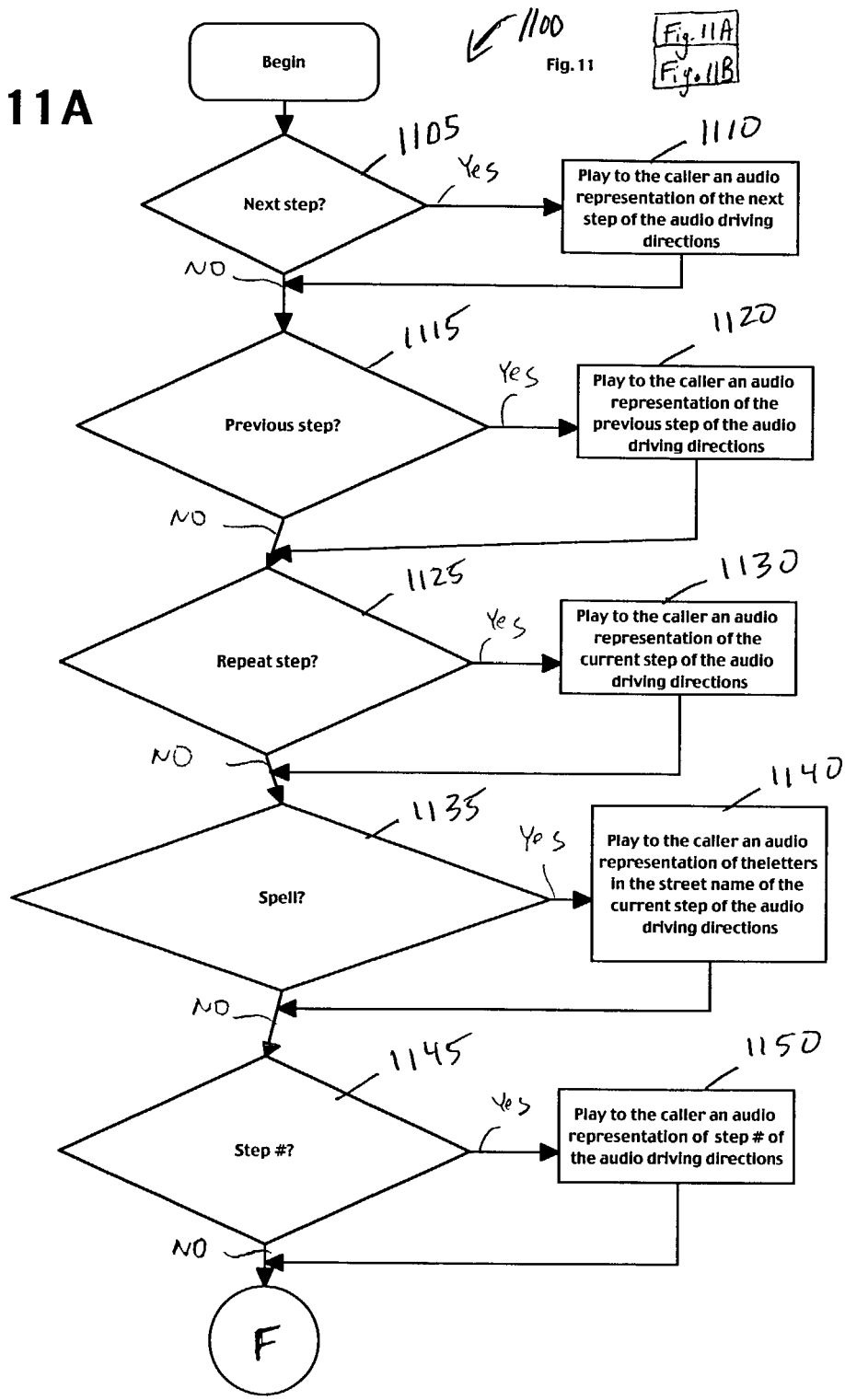
FIG. 11 illustrates a flow chart showing a method of responding to commands provided by a caller during delivery of audio driving directions in accordance with an embodiment of the present invention.

Referring to FIG. 11A, at Block 1105, the voice portal 110 determines whether the next step command has been inputted by the caller 50. If the next step command has been inputted by the caller 50, at Block 1110 the voice portal 110 plays to the caller 50 an audio representation of the next step of the audio driving directions.

At Block 1115, the voice portal 110 determines whether the previous step command has been inputted by the caller 50. If the previous step command has been inputted by the caller 50, at Block 1120 the voice portal 110 plays to the caller 50 an audio representation of the previous step of the audio driving directions.

Continuing at Block 1125, the voice portal 110 determines whether the repeat step command has been inputted by the caller 50. If the repeat step command has been inputted by the caller 50, at Block 1130 the voice portal 110 plays to the caller 50 an audio representation of the current step of the audio driving directions.

Furthermore, at Block 1135, the voice portal 110 determines whether the spell command has been inputted by the caller 50. If the spell command has been inputted by the caller 50, at Block 1140 the voice portal 110 plays to the caller 50 an audio representation of the letters in the street name of the current step of the audio driving directions.

At Block 1145, the voice portal 110 determines whether the step # command has been inputted by the caller 50, whereas # represents a step number. If the step # command has been inputted by the caller 50, at Block 1150 the voice portal 110 plays to the caller 50 an audio representation of step # of the audio driving directions, whereas # represents a step number.

Figure 11B:
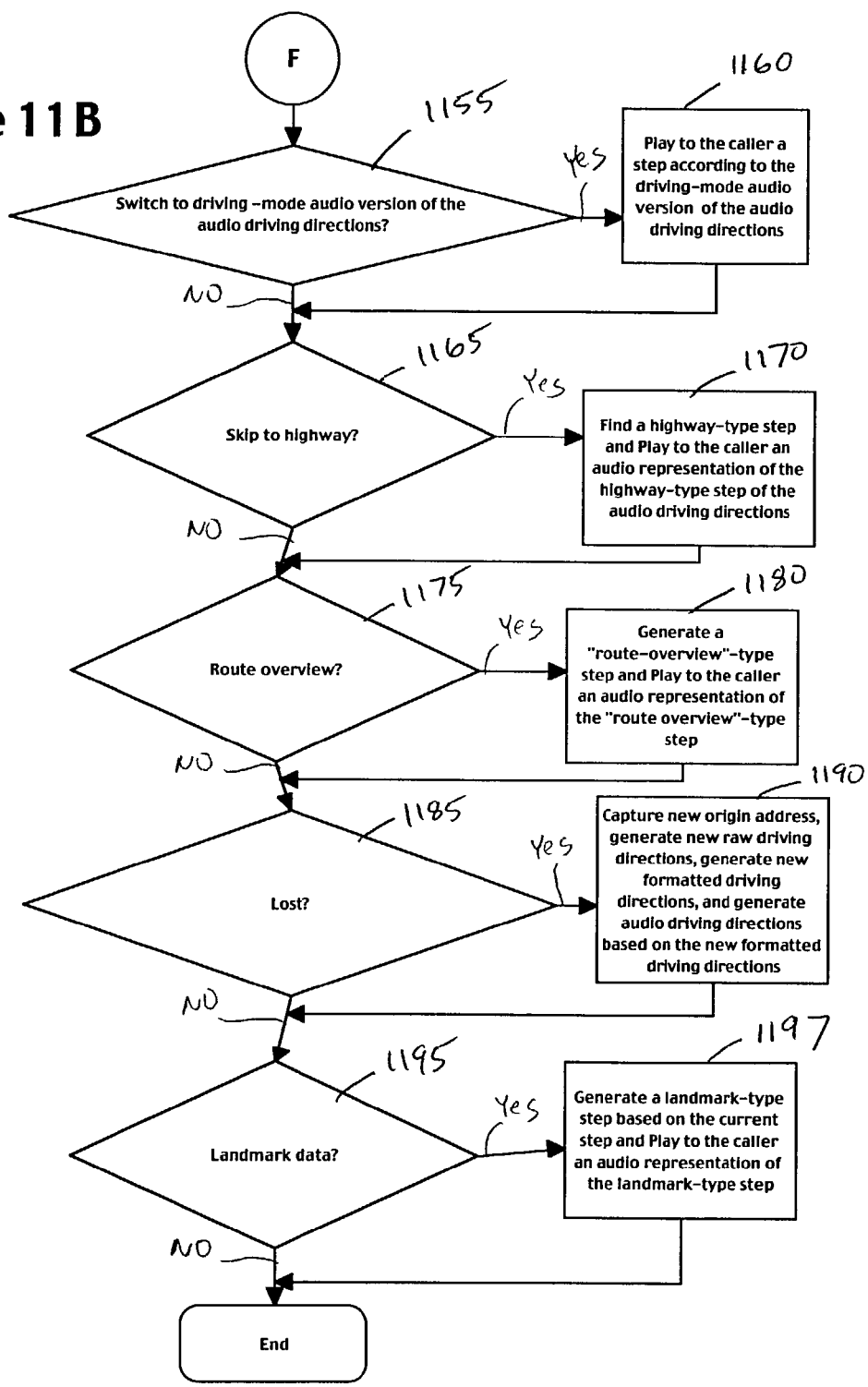

Referring to FIG. 11B, at Block 1155, the voice portal 110 determines whether to switch to the driving-mode audio version of the audio driving directions. If a switch to the driving-mode audio version of the audio driving directions is made, at Block 1160 the voice portal 110 plays to the caller 50 a step according to the driving-mode audio version of the audio driving directions.

Furthermore, at Block 1165, the voice portal 110 determines whether the skip-to-highway command has been inputted by the caller 50. If the skip-to-highway command has been inputted by the caller 50, at Block 1170 the voice portal 110 finds a highway-type step and plays to the caller 50 an audio representation of the highway-type step of the audio driving directions. The highway-type step includes a maneuver involving a highway.

At Block 1175, the voice portal 110 determines whether the route overview command has been inputted by the caller 50. If the route overview command has been inputted by the caller 50, at Block 1180 the voice portal 110 generates a "route overview"-type step and plays to the caller 50 an audio representation of the "route overview'-type step. The "route overview"-type step includes information from several steps of the audio driving directions.

Additionally, at Block 1185, the voice portal 110 determines whether the lost command has been inputted by the caller 50. If the lost command has been inputted by the caller 50, at Block 1190 the voice portal 110 captures a new origin address from the caller, provides the new origin address and the destination address to the external resource 280, receives new raw driving directions from the external resource 280, generates new formatted driving directions based on the new raw driving directions, and generates new audio driving directions based on the new formatted driving directions.

At Block 1195, the voice portal 110 determines whether the landmark data command has been inputted by the caller 50. If the landmark data command has been inputted by the caller 50, at Block 1197 the voice portal 110 generates a landmark-type step based on the audio driving directions and plays to the caller 50 an audio representation of the landmark-type step. The landmark-type step includes landmark information to guide the caller 50 through the step of the audio driving directions.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of capturing an address from a caller via a telephone interface, said method comprising:
   setting a grammar;
   audibly prompting said caller to provide an utterance representing said address;
   receiving said utterance via said telephone interface;
   verifying said utterance using said grammar; and
   if said utterance matches multiple entries of said grammar, identifying said utterance from said multiple entries using a relative size threshold, wherein said identifying comprises:
      determining a relative size of each street name entry matching said utterance; determining whether said relative size threshold is exceeded by relative size of any of street name entries; and
      if said relative size threshold is exceeded by relative size of a particular street name entry, selecting said particular street name entry.

2. The method as recited in claim 1 wherein said grammar is set to one of city names, street names, and street numbers.

3. The method as recited in claim 1 wherein said verifying comprises:
   if verification of said utterance is unsuccessful, playing an audio error message to said caller via said telephone interface.

4. The method as recited in claim 1 further comprising:
   sending said address to a raw driving directions generator;
   verifying said address with said raw driving directions generator;
   if said verification of said address is unsuccessful, receiving an error message from said raw driving directions generator;
   determining a helpful error message to provide to said caller via said telephone interface based on said error message; and
   playing said helpful error message to said caller via said telephone interface.

5. A method of delivering audio driving directions via a telephone interface, said method comprising:
   capturing an origin address and a destination address inputted by a caller via said telephone interface;
   generating raw driving directions based on said origin and destination addresses;
   generating formatted driving directions from identifying a maneuver in said raw driving directions; wherein the maneuver comprises at least one of a merge-type, turn-type, and exit-ramp type;
   wherein said generating formatted driving directions comprises:
      removing one or more redundant steps from said raw driving directions;
      replacing one or more first steps from said raw driving directions;
      consolidating one or more second steps from said raw driving directions; and
      renumbering said steps of said raw driving directions to form said formatted driving directions;
   generating said audio driving directions based on said formatted driving directions; and
   playing to said caller said audio driving directions in response to a command provided by said caller.

6. A voice portal comprising:
   a processor;
   a memory for storing therein instructions which when executed perform a method of capturing an address from a caller via a telephone interface, said method comprising:
      setting a grammar;
      audibly prompting said caller to provide an utterance representing said address;
      receiving said utterance via said telephone interface;
      verifying said utterance using said grammar; and
      if said utterance matches multiple entries of said grammar, identifying said utterance from said multiple entries using a relative size threshold, wherein said identifying comprises:
         determining a relative size of each street name entry matching said utterance; determining whether said relative size threshold is exceeded by relative size of any of street name entries; and
         if said relative size threshold is exceeded by relative size of a particular street name entry, selecting said particular street name entry.

7. The voice portal as recited in claim 6 wherein said grammar is set to one of city names, street names, and street numbers.

8. The voice portal as recited in claim 6 wherein said verifying comprises:
   if verification of said utterance is unsuccessful, playing an audio error message to said caller via said telephone interface.

9. The voice portal as recited in claim 6 wherein said method further comprises:
   sending said address to a raw driving directions generator;
   verifying said address with said raw driving directions generator;
   if said verification of said address is unsuccessful, receiving an error message from said raw driving directions generator;
   determining a helpful error message to provide to said caller via said telephone interface based on said error message; and
   playing said helpful error message to said caller via said telephone interface.

* * * * *